United States Patent Office 3,035,007
Patented May 15, 1962

3,035,007
METAL COATING COMPOSITION COMPRISING VINYL RESIN, PHENOLIC - FORMALDEHYDE RESIN, EPOXIDE RESIN AND MELAMINE-FORMALDEHYDE RESIN
David Howard Harper, Huntington, N.Y., assignor to American Can Company, New York, N.Y., a corporation of New Jersey
No Drawing. Filed May 18, 1959, Ser. No. 813,664
3 Claims. (Cl. 260—45.1)

The present invention pertains to a coating composition for metal surfaces having a vinyl resin as its predominant ingredient. The invention pertains more particularly to a coating composition for steel, aluminum and tin surfaces either with or without a prime coating of a dissimilar material such as a resin comprising a combination of vinyl resins modified with other specific resins.

Because of their excellent resistance to water and water vapor, and their relative chemical inertness, vinyl resins are well suited as the main ingredient in coating compositions for the interior surface of tin plate containers. However, two serious difficulties experienced with vinyl resins as coatings are their poor adhesion and their heat instability whereby at temperatures best suited to the baking or curing of the resin film, the vinyl resins, especially in contact with certain metals such as tin and iron, tend to decompose with the liberation of hydrogen chloride. The addition of phenolic resins to counteract these deficiencies of vinyl resins is known in the art. However, the art has consistently been seeking new and improved phenolics to improve the adhesion and thermal stability of the vinyl resins and at the same time to improve the properties of the whole composition as a protective coating.

It is therefore an object of the instant invention to provide a vinyl resin coating composition which has excellent heat stability, even in excess of 400° F.

It is another object of the instant invention to provide a vinyl resin coating composition which, when applied to an aluminum, tin or ferrous metal surface, protects the metal surface against corrosive attack, forms a moisture impermeable barrier between the metal surface and its external environment, adheres strongly to the metal surface and is inert to the action of many corrosive substances.

A further object is to provide a vinyl resin coating composition which is readily applicable to a flat sheet by means of roller coating; or, when at a lower viscosity, to the interior surface of a tin plate can by means of spraying.

It is also an object to provide a vinyl resin coating composition which forms an excellent second coat over a resinous base coat on the interior surface of a tin plate container especially adapted to contain a carbonated beverage such as beer or soft drink; and in this capacity maintains the iron pick-up by the product at a very low minimum.

Numerous other objects and advantages of the invention will be apparent as it is better understood from the following description which is of a preferred embodiment thereof.

The above objects are accomplished by applying to a surface to be coated a composition containing vinyl resins, a phenol-aldehyde resin, an epoxide resin, and a melamine-aldehyde resin. The various resins are combined in critical proportions in order to accomplish the objects above specified.

The vinyl resins of the subject composition are a mixture of three different vinyl resins. The predominant vinyl resin is a copolymer of 85 to 95% vinyl chloride and 5 to 15% vinyl acetate. The next largest vinyl resin ingredient is an interpolymer of vinyl chloride, vinyl acetate and maleic acid, which interpolymer is disclosed and described in U.S. Patent 2,329,456. The last vinyl resin present in the composition is a copolymer of vinyl chloride and vinyl acetate hydrolyzed to produce in the copolymer 2 to 20% vinyl alcohol. This last resin is disclosed and described in U.S. Patent 2,512,726. Particularly preferred as the vinyl resins in the instant coating composition are: a copolymer of 87% vinyl chloride and 13% vinyl acetate known commercially as VYHH; an interploymer of 86% vinyl chloride, 13% vinyl acetate and 1% maleic acid known commercially as VMCH; and a polymer consisting of, in polymerized form, 91% vinyl chloride, 3% vinyl acetate and 6% vinyl alcohol known commercially as VAGH.

Relative to one another, these vinyl resins are present in an amount of 80-90% of the vinyl chloride-vinyl acetate copolymer, 8 to 15% of the interpolymer of vinyl chloride, vinyl acetate and maleic acid; and 2 to 12% of the hydrolyzed vinyl chloride-vinyl acetate copolymer. In the final coating composition, the combination of these vinyl resins constitutes 85 to 93% by weight.

The epoxy resin, derived from bisphenol, i.e. p,p' dihydroxydiphenyldimethylmethane, is added to the vinyl resins to improve the heat stability of the composition and its adhesion to the substrate. The molecules of this resin consist of alternating esterifiable glyceryl radicals and the hydrocarbon radicals of the bisphenol united in a chain through ether oxygen atoms, the molecule terminating in epoxide glyceryl radicals and having in its interior hydroxyl substituted glyceryl radicals. This resin is disclosed and described in U.S. Patents 2,456,408 and 2,592,560. The particular epoxide resin operable in the subject composition has an average molecular weight in the range of 375 to 750 and an epoxide equivalent in the range of 190 to 375. This epoxide resin is present in an amount of 2 to 5% by weight based on the total weight of non-volatile solvents.

The phenol-aldehyde resin used in the instant composition is the heat reactive, A stage condensation product of p,p' dihydroxydiphenyldimethylmethane and formaldehyde reacted in the presence of an alkaline catalyst in a mole ratio of about 1 to 1.5 respectively. The resin has an average molecular weight of about 750 to 850; and is a highly viscous liquid at room temperature. Due to its reactivity the resin should be maintained under refrigeration during storage. This bisphenol-formaldehyde reaction product reduces the water sensitivity of the vinyl-epoxy resin combination and also imparts additional heat stability to the vinyl resin. The coating composition contains 2 to 5% by weight of the phenol-aldehyde condensation product.

The melamine-aldehyde resin acts, in effect, as a plasticizer. By this is meant that the addition of the melamine-aldehyde resin offsets the embrittling effect of the two phenolic resins above so that the subject composition when in the form of a dry film is flexible and tough and will not fracture when the metal to which it is applied is shaped and formed. This resin is incorporated in the composition in its water insoluble, organic solvent soluble B stage; and is present in an amount of 3-6% by weight based on the total weight of nonvolatile solids.

For application to a metal surface the above described resins are dissolved in a suitable solvent system. In general the solvent system most effective to provide a solution of the necessary viscosity for application is composed essentially of ketones and aromatic hydrocarbons such as toluol and xylol. The ketones found most satisfactory are methyl ethyl ketone and methyl isobutyl ketone, although the system may contain a minor proportion of higher boiling ketones such as isophorone.

The following example is by way of description only and is not to be construed as a limitation on the invention.

*Example*

The following formulation was prepared by dissolving the nonvolatile resin solids in the solvents designated.

| Ingredient: | Percent by weight |
|---|---|
| VYHH | 16.338 |
| VMCH | 1.921 |
| VAGH | .960 |
| Bisphenol-formaldehyde [1] | .831 |
| Epoxy [2] | .582 |
| Melamine-formaldehyde | .966 |
| Sec. butanol | .122 |
| Xylol | 46.835 |
| MEK | 7.907 |
| MIK | 15.631 |
| Isophorone | 7.785 |
| Propylene ether wetting agent | .122 |

[1] Condensation product of 1 mole bisphenol and 1.47 moles formaldehyde.
[2] Epichlorhydrin-bisphenol reaction product having an average mol. wt. of about 385 and an epoxide equivalent of about 195.

This composition had a viscosity of about 60–70 seconds #4 Ford cup at 25° C.

The composition was applied over a tin plate surface which had been purposely deeply scratched to expose the base steel. The coated surface was then baked at about 345° F. for 10 minutes. No evidence of thermal degradation was observed in the area of the deep scratch, thereby indicating a very high degree of thermal stability. The adhesion and flexibility of the dry coating was considered superior to the existing commercial materials. Upon examination of packed cans coated with the composition of the instant invention, it was found that this composition imparted no off-taste or color to the product.

It is thought that the invention and many of its attendant advantages will be understood from the foregoing description, and it will be apparent that various changes may be made in the matter of the ingredients, their identity and the proportions without departing from the spirit and scope of the invention or sacrificing all of its material advantages, the form hereinbefore described being merely a preferred embodiment thereof.

I claim:
1. A metal coating composition comprising by weight 85 to 93% of a vinyl resin, 2 to 5% of an alkaline condensed p,p' dihydroxydiphenyldimethylmethane-formaldehyde resin, 2 to 5% of an epoxide resin having alternately an esterifiable glyceryl radical and the hydrocarbon radical of a diphenol united in a chain through ether oxygen atoms, and 3 to 6% of a water-insoluble B stage melamine-formaldehyde resin, said vinyl resin consisting essentially of, by weight, 80 to 90% of a vinyl chloride-vinyl acetate copolymer, 8 to 15% of an interpolymer of vinyl chloride, vinyl acetate and maleic acid, and 2 to 12% of a vinyl chloride-vinyl acetate copolymer hydrolyzed so as to convert 2 to 20% of its weight to polyvinyl alcohol.

2. The composition set forth in claim 1 wherein said epoxide resin is a viscous liquid at room temperature.

3. The composition set forth in claim 1 wherein said hydrocarbon radical of said epoxide resin is the hydrocarbon radical of p,p'-dihydroxydiphenyldimethylmethane.

References Cited in the file of this patent

UNITED STATES PATENTS

| 2,512,726 | Penn et al. | June 27, 1950 |
| 2,699,413 | Seagren et al. | Jan. 11, 1955 |
| 2,793,141 | Barr | May 21, 1957 |
| 2,951,769 | McKnight | Sept. 6, 1960 |
| 2,962,460 | Chapin et al. | Nov. 29, 1960 |